(12) United States Patent
Kimmerly et al.

(10) Patent No.: US 7,743,318 B2
(45) Date of Patent: Jun. 22, 2010

(54) ORDER INDEPENDENT BATCHED UPDATES ON A TEXT BUFFER

(75) Inventors: Randy S. Kimmerly, Woodinville, WA (US); Vijaye G. Raji, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1140 days.

(21) Appl. No.: 11/363,864

(22) Filed: Feb. 27, 2006

(65) Prior Publication Data

US 2007/0204221 A1     Aug. 30, 2007

(51) Int. Cl.
*G06F 17/21* (2006.01)
(52) U.S. Cl. ...................................................... 715/229
(58) Field of Classification Search .................. 715/531, 715/229
See application file for complete search history.

(56) References Cited

U.S. PATENT DOCUMENTS 5,671,428 A * 9/1997 Muranaga et al. ........... 715/751

2004/0049735 A1 * 3/2004 Tsykora ....................... 715/513
2004/0100482 A1 * 5/2004 Cajolet et al. ............... 345/716
2007/0101256 A1 * 5/2007 Simonyi ...................... 715/511

* cited by examiner

*Primary Examiner*—Doug Hutton
*Assistant Examiner*—Tionna Smith
(74) *Attorney, Agent, or Firm*—Woodcock Washburn LLP

(57) ABSTRACT

The embodiments contemplate a system and method for the application of concurrent edits to the same version of a text. The concurrent edits may occur simultaneously or near simultaneously through collaborative editing schemes, where more than one user, processor, or agent applies edits to the version of the text. The application of the concurrent edits includes modifying or transforming the edits to account for changes made to the version of the text and applying the modified edits to the most recent version of the text. As edits may change the positioning of the text, an evaluation of the changes in the positioning of the text may be part of the modification.

13 Claims, 5 Drawing Sheets

| TEXT BUFFER VERSION 1 210 | | | | | | | | | | | | |
|---|---|---|---|---|---|---|---|---|---|---|---|---|
| POSITION 410 | 0 | 1 | 2 | 3 | 4 | 5 | 6 | 7 | 8 | 9 | 10 | 11 |
| CHARACTER 420 | a | b | c | d | e | f | g | h | i | j | k | l |

401

| TEXT BUFFER VERSION 1a 310 | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | |
| a | b | c | d | 1 | 2 | 3 | e | f | g | h | i | j | k | l | |

401a

| TEXT BUFFER VERSION 1b 320 | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| a | b | c | d | 1 | 2 | 3 | x | y | z | g | h | i | j | k | l |

401b

| TEXT BUFFER VERSION 2 220 | | | | | | | | | | | | |
|---|---|---|---|---|---|---|---|---|---|---|---|---|
| 0 | 1 | 2 | 3 | 4 | 5 | 6 | 7 | 8 | 9 | 10 | 11 | 12 |
| a | b | c | 1 | 2 | 3 | x | y | z | i | j | k | l |

ORDER INDEPENDENT BATCHED UPDATES ON A TEXT BUFFER

BACKGROUND

A text buffer is a storage space in memory that is used to store text. The text buffer supports operation of a text editor. Text is stored in a buffer, and, when text is edited, the edited text is stored in a new version of the buffer. In a version tracking text buffer, the version of the buffer is updated each time an edit occurs. In such a tracking text buffer, as edits to the text are applied, new versions of the buffer are created in the same order that the edits are made. Thus, an edit made to text results in a new, updated version of the buffer. If another edit is then made to the text, the edit is applied to create another updated version of the text buffer.

Concurrent edits may also be made to text, in which case multiple edits are made to the same or similar version of the text buffer. Concurrent edits may occur when a document is being shared and edited by two users, agents, or processors, for example in a collaborative editing scenario. In such a situation, a first user may make a change to the text at substantially the same time a second user makes a change to the text. Obviously, both users expect their changes to apply in the manner in which they intended.

However, concurrent edits typically cannot be applied to the text, and stored in the text buffer, in the same manner as sequential edits. In fact, sequentially applying the concurrent edits to the text buffer causes undesirable effects. If one edit is applied to text and a new version of the buffer created, then applying a second edit to the new version results in an unwanted edit as the edit is being made to the new version instead of to the original version. Edits change the position of the text. For example, a deletion of two characters moves any succeeding characters to an earlier position. Similarly, an insertion of a character moves succeeding characters to a later text position. Therefore, if one edit involves a deletion and a second, concurrent edit involves an insertion, then the edits being applied in a sequential manner causes the second edit to occur at an unintended position.

Therefore, a mechanism that allows concurrent edits to be made to the same or similar version of a text buffer is desired.

SUMMARY

The application of edits, which may be concurrent edits in a collaborative editing scenario, to a version of text may include a modification of edits to adjust for prior edits. The modification may include a comparison of versions of text to determine how the versions have changed. The comparison may include a comparison of positions of the versions of the text. The modification may also include a transformation of the edit. After appropriate modifications are made, the modified edits may be applied to the most recent version of the text.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description are better understood when read in conjunction with the appended drawings. Exemplary embodiments are shown in the drawings, however it is understood that the embodiments are not limited to the specific methods and instrumentalities depicted therein. In the drawings:

FIG. 4 is a table representing an example scenario of concurrent edits applied to text;

DETAILED DESCRIPTION

Figure 1:
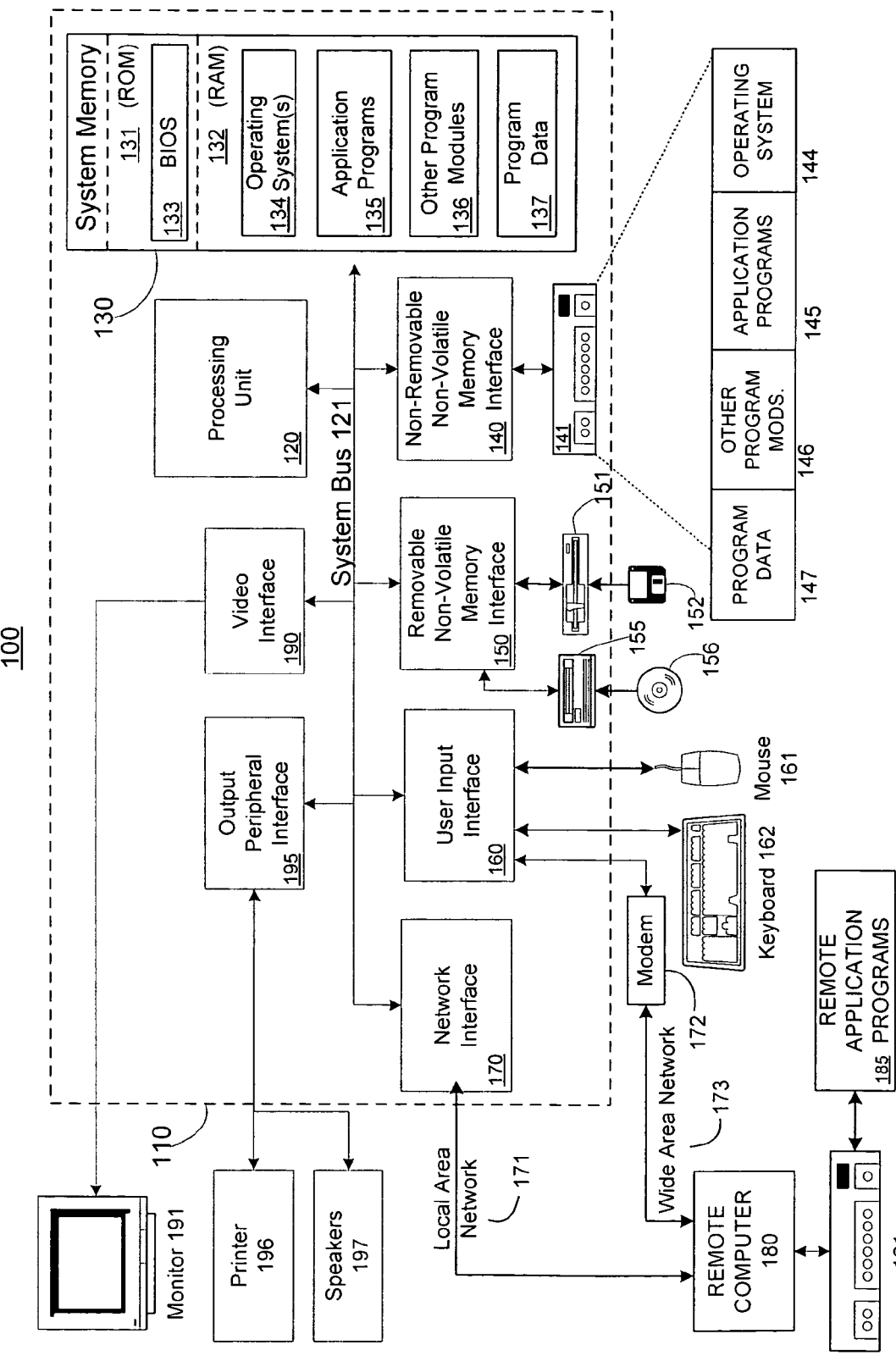
FIG. 1 is a block diagram representing an exemplary computing device.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133

(BIOS), containing the basic routines that help to transfer information between elements within the computer 110, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as an interface 140, and the magnetic disk drive 151 and the optical disk drive 155 are typically connected to the system bus 121 by a removable memory interface, such as an interface 150.

The drives and their associated computer storage media, discussed above and illustrated in FIG. 1, provide storage of computer readable instructions, data structures, components, program modules and other data for the computer 110. In FIG. 1, for example, the hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and a pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

All or portions of the methods of the present invention described above may be embodied in hardware, software, or a combination of both. When embodied in software, the methods of the present invention, or certain aspects or portions thereof, may be embodied in the form of program code that when executed by a computing system cause the computing system to perform the methods of the present invention. This program code may be stored on any computer-readable medium, as that term is defined above.

Figure 2:
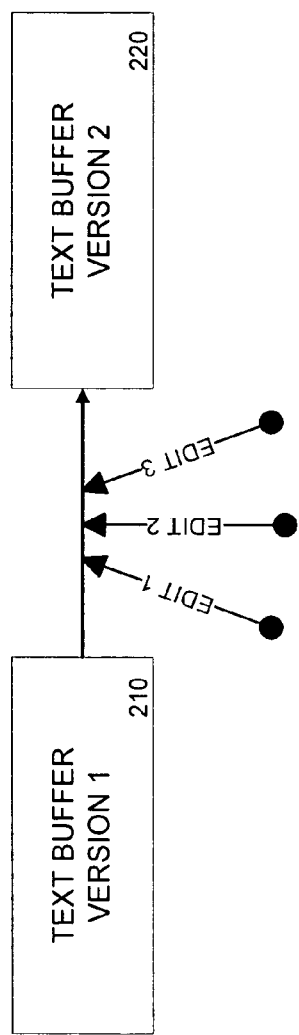
FIG. 2 is a block diagram representing a portion of an exemplary concurrent tracking buffer.

A concurrent edit tracking scenario for applying concurrent edits to a version of text is illustrated in FIG. 2. The concurrent edit tracking scenario may include a text buffer version 1 210 and a text buffer version 2 220. The text buffer version 1 210 may store a current text version (a text version 1). Edits 1, 2, and 3 may be applied to the text version 1. The text buffer version 2 220 may represent the version of text stored in the buffer after the multiple and concurrent edits 1, 2, and 3 are applied to the text version 1. The text stored in the text buffer version 2 220 may be referred as a text version 2. The edits 1, 2, and 3 may occur simultaneously or near simultaneously in a collaborative editing scenario, where the different edits may be made by different users, processors, or agents. The edits 1, 2, and 3 are made to the same or similar version of text, which, in the example illustrated, is the text version 1 stored in the text buffer version 1 210.

If the edits 1, 2, and 3 are applied sequentially to the text version 1, the text version 2 may not be accurate. For example, if edit 1 is first applied to the text version 1 stored in the text buffer version 1 210, followed by edit 2 and then edit 3, the resulting text version 2 may be different than if the edits were applied in the order of 2, 3, and 1. For concurrent edits, the edits may be order-independent; thus the sequential application of edits is not a feasible solution for applying concurrent edits.

Figure 3:
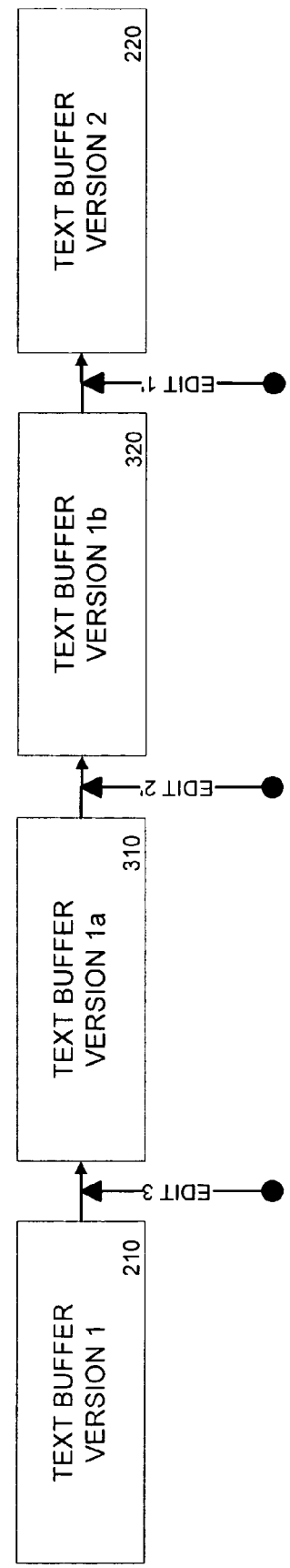
FIG. 3 is a block diagram representing another exemplary concurrent tracking buffer.

FIG. 3 illustrates a concurrent tracking scenario that may account for the desirability of order independence in the case of multiple and concurrent edits. The text version 1 is stored in the text buffer version 1 210, and an edit, such as edit 3, may be applied to the text version 1. The resulting edit may be stored in the text buffer version 1*a* 310. Following edit 3, a modified edit 2 (edit 2') may be applied to the text version 1*a*, resulting in a text version 1*b* stored in a text version buffer 1*b* 320. Edit 2 may be modified to adjust for the edit to text version 1 (edit 3). Edit 1 may be modified (edit 1') and applied to the text version 1*b*. The application to the text of the modified edit 1 is stored in the text version buffer 2 220. The modifications to the edits may be made so that the order of applying the edits is inconsequential.

The application and modification of concurrent edits to the text version 1 may be explained with reference to an example. FIG. 4 provides just one example of text stored in the text version buffer 1 210 and of concurrent edits. A position 410 of each character 420 of the text is also indicated. The position 410 of the text's characters 420 may be a relevant consideration as edits may change positions. If position changes are not taken into consideration, then accurate edits may not be made.

In the example of FIG. 4, the text version 1 401, the text version 1a 401a, the text version 1b 401b, and the text version 2 402 are indicated. The text versions 1 401, 1a 401a, 1b 401b, and 2 402 may be stored in the text buffers version 1 210, version 1a 310, version 1b 320, and version 2 220, respectively.

Also shown in the example are 12 characters from position 0 to position 11, which is the text version 1 401. Assume, as an example of concurrent edits, the following three edits are concurrently made to the text version 1 401:

Edit 1: Deletion of 5 characters starting from position 3;
Edit 2: Replacement of 2 characters from position 4 by the text "xyz"; and
Edit 3: Insertion of the text "123" at position 4.

In order for proper concurrent editing to occur, any order of applying the edits 1, 2, and 3 may be used. The order-independence may ensure that the same resulting text version, in this case the text version 2 402, occurs in any edit ordering. In the example, the edit 3 is first applied, followed by the edit 2, then the edit 1.

Edit 3 requires the insertion of "123" at position 4. Edit 3 may be applied to the text version 1 401, resulting in the text version 1a 401a. "123" is added at position 4 of the text version 1 401. The succeeding characters' positions are affected by this edit. For example, the character "g" is now at position 9. "1", "2", and "3" are now at positions 4, 5, 6, respectively. As edit 3 is the first applied edit, edit 3 may not require a modification.

Next, edit 2 is be applied to text version 1a 401a. Edit 2 originally calls for replacing two characters starting from position 4 with the text "xyz."

However, edit 2 needs to first be modified before it can be applied. For example, if edit 2 was not modified, then characters "1" and "2" at positions 4 and 5, respectively, would be replaced by "xyz." However, the user, processor, or agent making edit 2 expects "xyz" to replace the characters originally located at positions 4 and 5, namely characters "e" and "f." "e" and "f," due to the application of edit 3, are now at positions 7 and 8 of the text buffer version 1a 310. Thus, edit 2 may be modified (edit 2') to: Replacement of 2 characters from position 7 by the text "xyz."

After edit 2' is applied to the text version 1a 401a, stored in the text buffer version 1a 310, the resulting text is the text version 1b 401b, stored in the text buffer version 1b 320. This version is illustrated in FIG. 4.

In the example of concurrent edits, edit 1 still needs to be applied. This edit will be applied to the text version 1b 401b.

However, edit 1 needs to first be modified before it can be applied. For example, if edit 1 was not modified, then characters "d," 1," "2," "3," and "x" at positions 3 through 7, respectively, would be deleted. However, the user, processor, or agent making edit 1 expects characters "d," "e," "f," "g," and "h" to be deleted. Characters "e" and "f" have already been deleted due to previous edits. Characters "d," "g," and "h" still need to be deleted in order to satisfy the edit. Thus, edit 1 may be modified (edit 1') to: Deletion of one character at position 3 and deletion of two characters starting from position 10. It should be appreciated that this is just one example of a possible embodiment. This example is not limiting, but is provided merely for the purposes of clarity and explanation. For example, the embodiment is not limited to the number of edits, the number of buffers, and/or the number of concurrent edits. Instead, the embodiments are meant to include any number of such aspects. Also, it should be appreciated that the embodiments are not limited to the amount or type of text that is available and/or edited.

After edit 1' is applied to the text version 1b 401b, stored in the text buffer version 1b 320, the resulting text is the text version 2 402, stored in the text buffer version 2 220. This version is illustrated in FIG. 4. A similar analysis may be performed for other concurrent edits.

Figure 5:
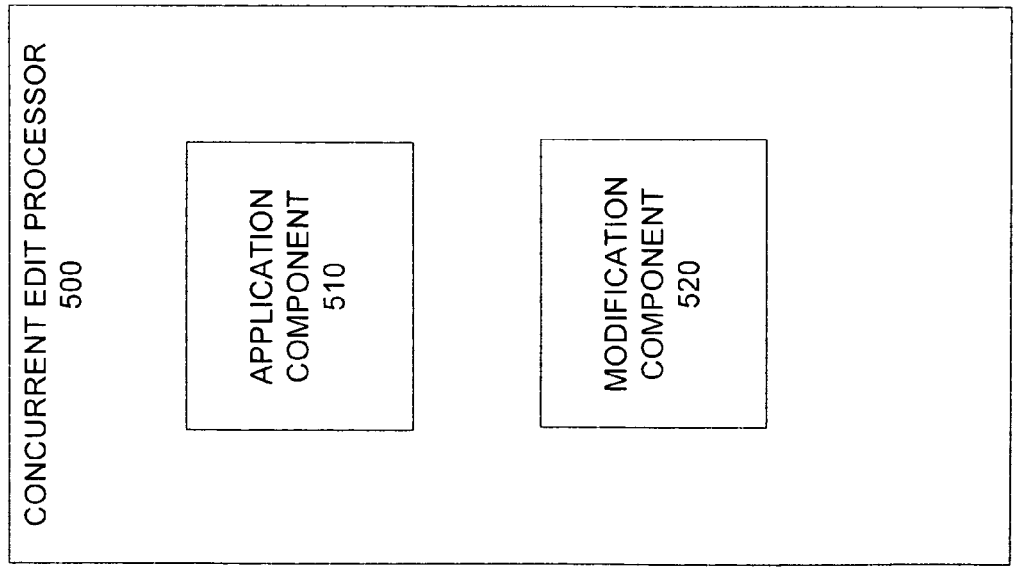
FIG. 5 is a block diagram representing an edit processor.

A concurrent edit processor 500 for applying multiple edits is illustrated in the block diagram of FIG. 5. The concurrent edit processor 500 includes several means, devices, software, and/or hardware for performing functions, including an application component 510 and a modification component 520, which operate to process and apply concurrent edits to a version of text.

The application component 510 may be responsible for applying a first edit to a first version of the text to create a second version of the text. For example with reference to FIG. 3, the application component 510 may apply edit 3 to the text version 1 401 stored in the text buffer version 1 210. After edit 3 is applied by the application component, a new version, the text version 1a 401a stored in the text buffer version 1a 310, is created.

Figure 6:
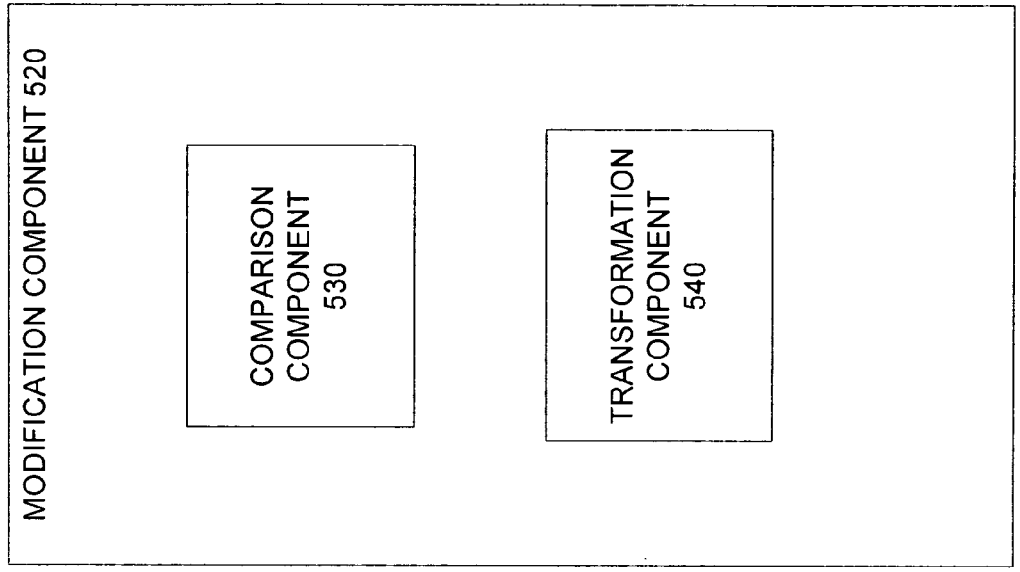
FIG. 6 is a block diagram representing a modification component of an edit processor.

The modification component 520 may operate to modify additional and concurrent edits so that the edits be applied in an order-independent manner. The modification component 520 may modify edit 2 to edit 2' and edit 1 to edit 1'. The modification component 520 may include several means, devices, software, and/or hardware for performing the modification functions, including a comparison component 530 and a transformation component 540. The modification component 520 is illustrated in the block diagram of FIG. 6.

The comparison component 530 may compare versions of text, such as text version 1 401 and text version 1a 401a. The comparison may be performed in order to obtain information on changes that have occurred to the text version 1 401, such as, for example, changes to the position of the characters. This information may be used to determine how the edits should be modified. For example, if a character has changed position due to a previous edit, then the modified edit may include the new position of the character. The transformation component 540 may use the comparison information obtained by the comparison component 530 to accordingly transform the edit.

After the modification component 520, and more specifically the comparison component 530 and the transformation component 540, modify edit 2 to edit 2', the application component 510 may be utilized to apply the modified second edit, edit 2', to the second version of the text. This application results in a third version of the text. For example, application component 510 may apply edit 2' to the text version 1a 401a, resulting in the text version 1b 401b. The text version 1b 401b may be stored in the text buffer version 1b 320. The modification component 520 may modify additional edits to account for changes made to the text version 1 401.

Figure 7:
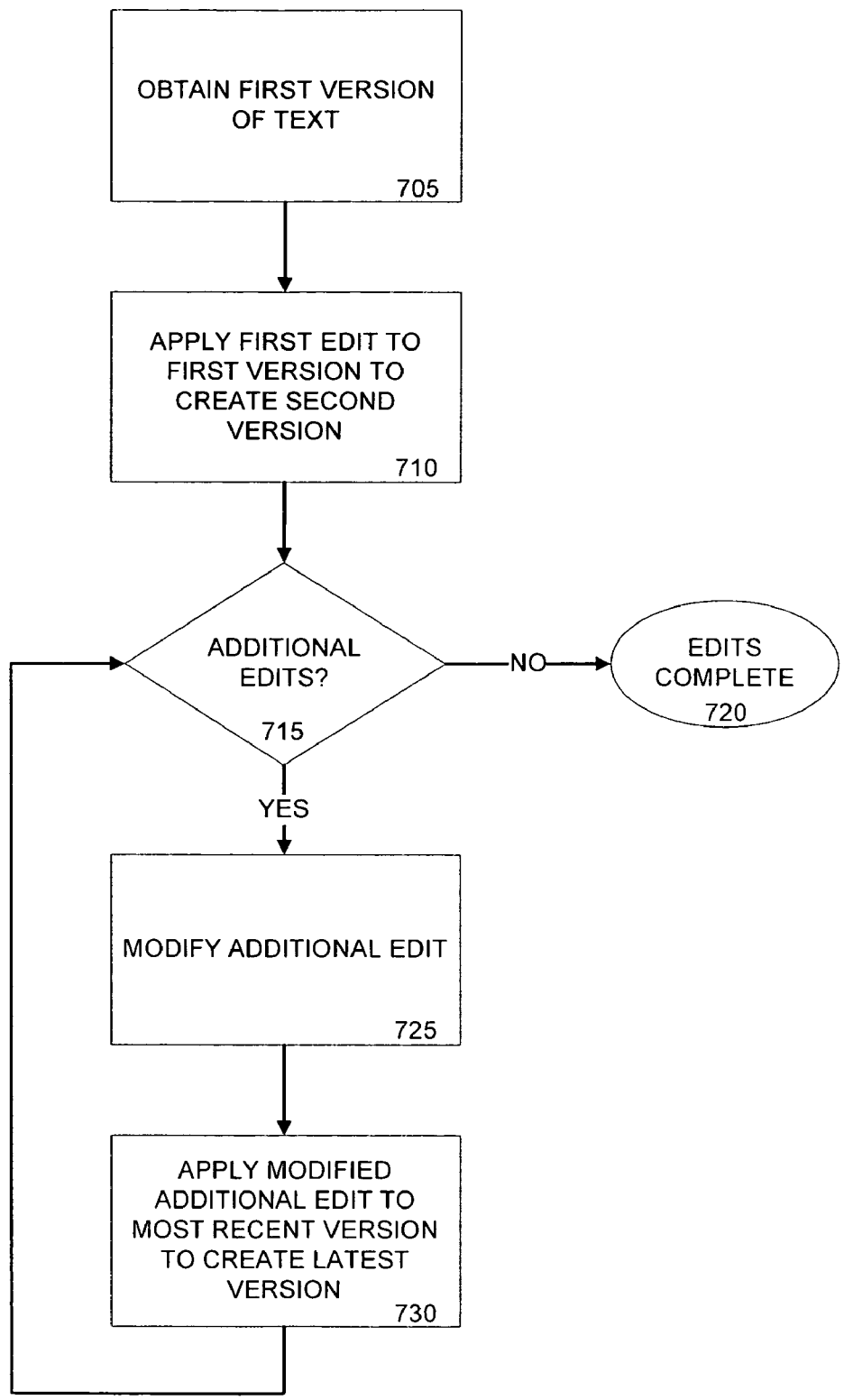
FIG. 7 is a flow diagram illustrating one embodiment of a method of applying edits to text.

FIG. 7 illustrates a method of applying edits to text. At 705, a first version of a text is obtained. The first version of the text may be stored in the text buffer version 1 210. At 710, a first edit may be applied to the first version of the text, creating a second version of the text. The second version of the text may be stored in the text buffer version 1a 310. The application of the first edit to the first version of the text may be performed by the application component 510 of the concurrent edit processor 500.

At 715, a determination may be made to ascertain if additional concurrent edits exist. If other edits were not concurrently made with the first edit to the first version of the text, then the edits are complete and the method ends at 720. If, instead, additional edits were concurrently made with the first edit to the first version of the text, then the method may proceed to 725.

At 725, an additional edit is modified. The additional edit may be modified by the modification component 520 of the concurrent edit processor 500. If the additional edit is a second edit, the modification may involve a comparison of the second version of the text with the first version of the text. The comparison may include a comparison of the position of the second version of the text with the position of the first version of the text. The modification may also include a transformation of the additional, second edit to adjust for any changes made by the first edit to the first version of the text.

At 730, after the additional edit has been modified, the modified additional edit may be applied to the most recent version of the text, creating a latest version of the text. The latest version of the text may be stored at text buffer version 1b 320, for example if the additional edit is a second edit. The application of the modified second edit to the most recent version of the text may be performed by the application component 510 of the concurrent edit processor 500.

After the application of the modified additional edit to the most recent version of the text, the method may proceed back to 715. Again at 715, a determination may be made to ascertain if additional concurrent edits exist. If other edits were not concurrently made, then the edits are complete and the method ends at 720. If, instead, additional edits were concurrently made, then the method may proceed to 725 and 730 to appropriately modify and apply, respectively, the additional edits. The method may proceed in such a manner, determining if additional edits exist and modifying and applying the additional edits if they do exist, until all of the edits have been applied. When no further edits exist, the process may then be complete, and the method ends at 720.

As can be appreciated, the disclosed embodiments may be implemented as a whole or in part in one or more computing systems or devices. FIG. 1 illustrates the functional components of one example of a computing system 100 in which aspects may be embodied or practiced. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, handheld computers, programmable consumer electronics, multimedia consoles, game consoles, satellite receivers, set-top boxes, automated teller machines, arcade games, mobile telephones, personal digital assistants (PDAs) and any other processor-based system or machine. The terms "program code" and "code" refer to any set of instructions that are executed or otherwise processed by a processor. Program code and/or data can be implemented in the form of routines, programs, objects, modules, data structures and the like that perform particular functions.

It is noted that the foregoing examples have been provided merely for the purpose of explanation and are in no way to be construed as limiting. While the invention has been described with reference to various embodiments, it is understood that the words which have been used herein are words of description and illustration, rather than words of limitation. Further, although the embodiments have been described herein with reference to particular means, materials, and examples, the embodiments are not intended to be limited to the particulars disclosed herein; rather, the embodiments extend to all functionally equivalent structures, methods and uses, such as are within the scope of the appended claims.

What is claimed:

1. A method of applying concurrent edits to text in a collaborative editing scenario, wherein the text is stored in a buffer, the method comprising:
   applying a plurality of concurrent edits to the text in an order-independent manner;
   applying a first edit to a first version of the text to create a second version of the text;
   modifying a second edit, originally to be applied to the first version of the text, by comparing the second version of the text to the first version of the text in order to adjust the second edit with respect to the first edit; and
   applying the modified second edit to the second version of the text to create a third version of the text,
   wherein, regardless of the order in which the edits are applied, the same resulting text version is obtained.

2. The method of claim 1, wherein comparing the second version of the text to the first version of the text comprises comparing a position of the second version of the text to a position of the first version of the text.

3. The method of claim 1, wherein the buffer is a text buffer.

4. The method of claim 1, further comprising:
   modifying a third edit; and
   applying the modified third edit to the third version of the text to create a fourth version of the text.

5. The method of claim 4, wherein modifying the third edit comprises:
   comparing the third version of the text to the first version of the text; and
   transforming the third edit to adjust for the first edit and the modified second edit.

6. An edit processor for applying concurrent edits to text in a collaborative editing scenario, comprising:
   a component for applying a plurality of concurrent edits to the text in an order-independent manner;
   a component for applying a first edit to a first version of the text to create a second version of the text;
   a modification component for modifying a second edit, originally to be applied to the first version of the text, by comparing the second version of the text to the first version of the text in order to adjust the second edit with respect to the first edit; and
   a component for applying the modified second edit to the second version of the text to create a third version of the text,
   wherein, regardless of the order in which the edits are applied, the same resulting text version is obtained.

7. The edit processor of claim 6, wherein the comparison component compares the second version of the text to the first version of the text by comparing a position of the second version of the text with a position of the first version of the text.

8. The edit processor of claim 6, wherein the modification component modifies a third edit, and wherein the modified third edit is applied to the third version of the text to create a fourth version of the text.

9. The edit processor of claim 6, further comprising a buffer component for storing the first version of the text and the second version of the text.

10. A computer-readable storage medium having computer-executable modules for applying concurrent edits to text in a collaborative editing scenario, comprising:
- a buffer module for storing versions of the text;
- a module for applying a plurality of concurrent edits to the text in an order-independent manner;
- a module for applying a first edit to a first version of the text to create a second version of the text;
- an edit modifier module for modifying a second edit, originally to be applied to the first version of the text, by comparing the second version of the text to the first version of the text in order to adjust the second edit with respect to the first edit; and
- a module for applying the modified second edit to the second version of the text to create a third version of the text, wherein, regardless of the order in which the edits are applied, the same resulting text version is obtained.

11. A computer-readable storage medium of claim 10, wherein the buffer module stores the second version of the text and the third version of the text.

12. A computer-readable storage medium of claim 10, wherein the edit modifier module modifies a third edit, and wherein the modified third edit is applied to the third version of the text to create a fourth version of the text.

13. A computer-readable storage medium of claim 10, further comprising:
- an advancement module for advancing the text to a new buffer after the edits have been applied.

* * * * *